(12) United States Patent
Reytier et al.

(10) Patent No.: US 10,608,271 B2
(45) Date of Patent: Mar. 31, 2020

(54) SOFC-BASED SYSTEM FOR GENERATING ELECTRICITY WITH CLOSED-LOOP CIRCULATION OF CARBONATED SPECIES

(71) Applicant: COMMISSARIAT A L'ENERGIE ATOMIQUE ET AUX ENERGIES ALTERNATIVE, Paris (FR)

(72) Inventors: Magali Reytier, Villars de Lans (FR); Isabelle Noirot Le Borgne, Saint Martin le Vinoux (FR); Guilhem Roux, Saint-Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 49 days.

(21) Appl. No.: 15/562,614

(22) PCT Filed: Mar. 30, 2016

(86) PCT No.: PCT/EP2016/056885
§ 371 (c)(1),
(2) Date: Sep. 28, 2017

(87) PCT Pub. No.: WO2016/156374
PCT Pub. Date: Oct. 6, 2016

(65) Prior Publication Data
US 2018/0115003 A1    Apr. 26, 2018

(30) Foreign Application Priority Data

Mar. 30, 2015 (FR) .................................. 15 52685

(51) Int. Cl.
*H01M 8/0612* (2016.01)
*H01M 8/0656* (2016.01)
(Continued)

(52) U.S. Cl.
CPC ..... *H01M 8/0618* (2013.01); *H01M 8/04014* (2013.01); *H01M 8/04164* (2013.01);
(Continued)

(58) Field of Classification Search
None
See application file for complete search history.

(56) References Cited

U.S. PATENT DOCUMENTS 7,482,078 B2    1/2009   Sridhar et al.
2009/0291336 A1   11/2009  Mizuno et al.

FOREIGN PATENT DOCUMENTS

EP    1 768 207 A1    3/2007
JP    2012/219233  *  11/2012  ............. H01M 8/12
(Continued)

OTHER PUBLICATIONS

English translation of JP 2012/219233 (Year: 2012).*
(Continued)

*Primary Examiner* — Yoshitoshi Takeuchi
(74) *Attorney, Agent, or Firm* — Oblon, McClelland, Maier & Neustadt, L.L.P.

(57) ABSTRACT

A reversible SOFC-based system for generating electricity, including: an solid-oxide-fuel-cell (SOFC) stack containing at least one elementary solid-oxide electrochemical cell, each of which is formed from a cathode, an anode and an electrolyte intermediate between the cathode and the anode; a separator of liquid and gas phases, which separator is connected to the outlet of the fuel-cell stack; a methanation reactor suitable for implementing a methanation reaction, the inlet of which is connected to the outlet of the phase separator and the outlet of which is connected to the inlet of the fuel-cell stack so that the mixture issued from the methanation reactor is introduced into the fuel-cell stack; and a tank for reversibly storing hydrogen, suitable for
(Continued)

storing hydrogen, the outlet of which is connected to the inlet of the methanation reactor.

13 Claims, 2 Drawing Sheets

(51) Int. Cl.
| | |
|---|---|
| *H01M 8/18* | (2006.01) |
| *H01M 8/04014* | (2016.01) |
| *H01M 8/04119* | (2016.01) |
| *H01M 8/0668* | (2016.01) |
| *H01M 8/04082* | (2016.01) |
| *H01M 8/12* | (2016.01) |
| *H01M 8/124* | (2016.01) |
| *H01M 8/0637* | (2016.01) |

(52) U.S. Cl.
CPC ..... *H01M 8/04201* (2013.01); *H01M 8/0656* (2013.01); *H01M 8/0668* (2013.01); *H01M 8/12* (2013.01); *H01M 8/186* (2013.01); *H01M 8/04216* (2013.01); *H01M 8/0637* (2013.01); *H01M 2008/1293* (2013.01); *Y02E 60/324* (2013.01); *Y02E 60/528* (2013.01); *Y02E 60/566* (2013.01)

(56) References Cited

FOREIGN PATENT DOCUMENTS

| | | |
|---|---|---|
| JP | 2012-219233 A | 11/2012 |
| KR | 10-2012-0050319 A | 5/2012 |
| WO | WO 2008/123968 A1 | 10/2008 |
| WO | WO 2013/029701 A1 | 3/2013 |

OTHER PUBLICATIONS

International Search Report dated Jun. 24, 2016 in PCT/EP2016/056885, citing documents AN-AQ therein, 2 pages.

French preliminary Search Report dated Jan. 27, 2016 in Patent Application No. FR 1552685 (with English translation of categories of cited documents) citing documents AN-AQ therein, 3 pages.

Fabien Ocampo, et al., "Methanation of carbon dioxide over nickel-based $Ce_{0.72}Zr_{0.28}O_2$ mixed oxide catalysts prepared by sol—gel method", Journal of Applied Catalysis A: General 369, 2009, pp. 90-96.

Dayong Tian, et al. "Bimetallic Ni—Fe total-methanation catalyst for the production of substitute natural gas under high pressure", Journal of Fuel 104, 2013, pp. 224-229.

\* cited by examiner

SOFC-BASED SYSTEM FOR GENERATING ELECTRICITY WITH CLOSED-LOOP CIRCULATION OF CARBONATED SPECIES

TECHNICAL FIELD

The present invention relates to the field of solid oxide fuel cells (SOFCs).

It relates more generally to a new system for generating electricity that comprises such a fuel cell and a hydrogen storage tank.

The invention is applied particularly with a tank for the reversible storage of hydrogen, preferably containing hydrides and more preferably metal hydrides, such as $MgH_2$.

A portion of the system according to the invention may advantageously be used in reverse mode, with electrochemical cells constituting an HTE electrolyzer, the tank then being used to store the hydrogen produced by the high-temperature electrolysis of water (HTE, high-temperature electrolysis or else HTSE, high-temperature steam electrolysis) also using solid oxides (SOEC, solid oxide electrolysis cell).

PRIOR ART

An SOFC fuel cell or an HTE electrolyzer generally consists of a stack of individual units (also referred to as SRU or single repeat units) each comprising a solid oxide electrochemical cell, consisting of three anode/electrolyte/cathode layers superposed on one another, and of interconnection plates made of metal alloys also known as bipolar plates, or interconnectors.

The role of the interconnectors is to ensure both the passage of the electric current and the circulation of the gases in the vicinity of each cell (steam injected, hydrogen and oxygen extracted in an HTE electrolyzer; air and hydrogen injected and water extracted in an SOFC cell) and to separate the anode and cathode compartments which are the compartments for circulation of the gases on the anode and cathode side, respectively, of the cells.

A fuel cell usually releases a lot of heat due to the oxidation of the hydrogen within it, which is a highly exothermic reaction.

Therefore, it is necessary to cool a fuel cell that operates with hydrogen.

The fuel cells supplied with hydrogen and operating at relatively low temperature are conventionally cooled by a liquid water circuit.

This solution is not an option for SOFC fuel cell technology since the SOFC operating temperatures are usually between 700° C. and 900° C.

To date, several technical solutions make it possible to respond to this difficulty.

The first consists in increasing the gas flow rates, in particular on the side of the oxidant, in general air, in order to thermalize the fuel cell, i.e. in order to try to balance the temperatures within it. But this has numerous drawbacks.

Specifically, the high flow rates that must be made to circulate in order to discharge the heat via the gases have several unfavorable impacts on the fuel cell.

Firstly, when a high flow rate of oxidant (air) must be compressed, this results in a significant drop in the efficiency of the fuel cell.

Next, the high flow rates result in pressure levels at the fuel cell stack inlet that may prove unacceptable for the performance of the seals.

Finally, a high flow rate of air combined with a low flow rate of fuel in order to maintain a high electrical efficiency, i.e. a ratio between the electric power generated and the calorific power of the incoming gases, may lead to significant pressure imbalances between fuel/oxidant chambers.

This is why the conventional heat management solution of this type of high-temperature fuel cell consists in supplying it directly with methane and steam in order to benefit from the endothermic reforming reaction that occurs upon contact with the nickel☐ zirconia-based cermet electrode.

This solution is naturally adopted when the fuel cell is coupled to the gas (methane) distribution network. Furthermore, the use of cells of the fuel cell having a support of nickel-zirconia-based cermet is favorable to the application of this solution. Specifically, with such a support, it is possible to introduce a sufficient thickness thereof, typically greater than 500 µm, so that the amount of nickel is sufficient to be able to carry out the virtually complete reforming of the methane within the fuel cell.

However, if for technical and/or economic reasons, it is not possible to directly couple an SOFC fuel cell to a methane distribution network, then the conventional solution of supplying pure hydrogen is used with the attendant drawbacks as mentioned above.

Furthermore, the operation of an SOFC fuel cell directly supplied by methane generates carbon dioxide $CO_2$, the release of which has an impact on the environment.

Patent application US 2009/0291336 describes the use of a methanation reactor coupled to an SOFC fuel cell in order to be able to use kerosene, which cannot be used as is, as fuel for the fuel cell, the kerosene first being reformed with steam in a reforming reactor upstream of the methanation reactor.

Patent application EP 1 768 207 also describes the use of a methanation reactor coupled to an SOFC fuel cell in order to be able to use ethanol, which cannot be used as is, as fuel for the fuel cell. Here too it is a question of enriching the reformed gas solely with methane.

U.S. Pat. No. 7,482,078 B2 describes a reversible system for the production of hydrogen by circulation of a gaseous fuel containing carbon C and hydrogen C elements, such as methane, through an SOFC fuel cell, a separation device being arranged at the outlet of the SOFC fuel cell in order to extract the hydrogen produced at the outlet of the fuel cell cathode, for the primary purpose of storing it.

According to one embodiment, repeating the references from that patent, a reinjection loop is provided, referenced 112 in FIGS. 1A to 1D, to exclusively reinject the hydrogen $H_2$ either upstream of the fuel cell referenced 110 (FIGS. 1A, 1C, 1D) or into a reformer referenced 124, itself upstream of the fuel cell 110. In electrolysis operating mode, the reverse mode to that of the SOFC fuel cell, according to one embodiment, a Sabatier reactor referenced 30 in FIG. 7 is arranged at the outlet of the anode of the electrolyzer referenced 10, for the primary purpose of storing methane produced by the Sabatier reaction within the reactor 30. Still according to this electrolysis operating mode, a separation device referenced 113 is arranged downstream of the reactor 30 to extract the hydrogen produced within the Sabatier reactor and reinject it exclusively upstream of this reactor 30.

There is thus a need to improve the electricity-generating systems comprising a hydrogen storage tank and a solid oxide fuel cell (SOFC), operating at high temperature, typically between 600° C. and 1000° C., in particular in order to overcome the drawbacks of a thermal management by high-flow-rate supplying of an SOFC fuel cell directly supplied with hydrogen, and when a direct coupling to a methane distribution network is not technically and/or economically possible, or in particular in order to overcome the drawbacks of releasing $CO_2$ from SOFC fuel cells directly supplied with methane.

The objective of the invention is to at least partly meet this need.

SUMMARY OF THE INVENTION

In order to do this, the invention relates, according to one of its aspects, to a reversible system for generating electricity with a solid oxide fuel cell (SOFC) comprising:

- a solid oxide fuel cell (SOFC) comprising at least one solid oxide individual electrochemical cell each formed of a cathode, an anode and an electrolyte inserted between the cathode and the anode;
- a gas-liquid phase separator, connected to the outlet of the fuel cell;
- a methanation reactor, suitable for carrying out a methanation reaction, the inlet of which is connected to the outlet of the phase separator and the outlet of which is connected to the inlet of the fuel cell so that the mixture resulting from the methanation reactor is introduced into the fuel cell;
- a tank for reversible storage of hydrogen, suitable for storing hydrogen, the outlet of which is connected to the inlet of the methanation reactor.

In other words, the invention consists in supplying hydrogen to a methanation reactor connected in a closed loop to an SOFC fuel cell. The hydrogen added from the storage tank is used to compensate for the liquid water which is removed by the gas-liquid separator downstream of the SOFC fuel cell. This separator is suitable for separating the water from the gas mixture mainly comprising hydrogen ($H_2$), carbon monoxide (CO) and carbon dioxide ($CO_2$), at the outlet of the fuel cell. The gas mixture may in addition comprise methane ($CH_4$) when the reforming is not complete within the fuel cell.

Thus, by means of the system according to the invention, it is possible to use 100% of the fuel that has left the tank while making all of the carbon-based species circulate in a loop that is closed upon itself.

In other words, with a system according to the invention, not only are the drawbacks of an SOFC fuel cell directly supplied with hydrogen eliminated, in particular the drawbacks linked to the requirement of supplying oxidant at high flow rates, this being without having recourse to a methane distribution network, but in addition there is no release of CO or $CO_2$ at the outlet of the fuel cell like in the prior art, since here the carbon-based species circulate in a closed loop.

As regards the actual operation of the system, in the range of temperatures preferentially envisaged between 700° C. and 900° C. for the fuel cell, the reforming reaction within the fuel cell is endothermic, while the oxidation of hydrogen is exothermic.

The choice of the incoming methane flow rate and of the (I-U) operating point of the fuel cell makes it possible to control the overall exothermicity of the fuel cell, or even enables autothermal operation. A high methane flow rate combined with a high current density may lead to a high thermal gradient within the fuel cell, in particular in the plane of the cells between the inlet and the outlet. A person skilled in the art may apply known design solutions that make it possible to homogenize the temperature within the fuel cell.

There are numerous advantages of the system according to the invention, among which mention may be made of:

- carrying out the reforming reaction and its reverse reaction, methanation, simultaneously within one and the same system and within independent components (reactors) makes it possible to have a heat sink and a heat source that are quite separate while being connected to one another. Thus, rather than making an SOFC fuel cell operate using hydrogen in a conventional manner, which may give rise to a highly exothermic reaction for which it is, despite everything, difficult to discharge and reuse the heat via the gases, the SOFC fuel cell according to the invention may be in virtually isothermal nominal operation and the heat source to be reused is supplied by the methanation reactor. This heat is then more controllable by means of the cooling circuit of the methanation reactor, that is to say by means of a dedicated fluidic circuit made of metal. Thus the risks of loss of the seals of the fuel cell at high flow rate, and the risks of breakage of fragile cells as in a system according to the prior art where the SOFC fuel cell is directly supplied with hydrogen, are avoided;
- the separation of the thermal functions in a system according to the invention, combined with a 100% use of the fuel that has left the tank via a gas circulation loop that is closed on itself offers a large operating range and therefore great flexibility of operation for an SOFC fuel cell. Specifically:
  - the current density produced by the fuel cell is dependent on the flow rate of hydrogen supplied by the tank;
  - the total flow rate of the gases circulating in the system, in particular the methane flow rate, controls the heat sink within the fuel cell and especially the reusable heat source emitted by the methanation reactor;
  - the difference between these two flow rates (total flow rate in the closed loop, flow rate of hydrogen from the tank) corresponds to the rate of use of the fuel that actually passes through the fuel cell relative to the fuel actually consumed and therefore that has left the tank. This rate of use makes it possible to control the heat supplied by the system for a given fuel cell electrical power.
  - for a given flow rate of hydrogen that has left the tank and therefore for a given current density, the lower this rate of use of the total hydrogen circulating, the more the fuel cell will produce electricity rather than heat, and therefore with a better efficiency, and the higher the amount of heat produced by the methanation reactor. Thus, a system according to the invention eliminates the drawbacks of other SOFC fuel cell systems according to the prior art, in which the high efficiencies are inevitably attained with high rates of use, capable of damaging the fuel cell and in which a portion of fuel is generally burnt at the outlet in order to limit the emissions of CO or to generate the required heat;
- the control of the operation of the system according to the invention may also be carried out by modifying the temperature of the methanation reactor, which modifies the amount of methane $CH_4$ formed and therefore the ratio of hydrogen to methane ($H_2/CH_4$) at the fuel cell inlet;
- the electrical power produced by the fuel cell may be decoupled from the reusable available heat within the system by adjusting the rate of use of the fuel relative to the flow rate of $H_2$ leaving the tank;

an over-stoichiometry of hydrogen makes it possible to reduce the heat emitted by the methanation in favor of a higher exothermicity for the fuel cell. It is thus possible to envisage a better management of the degradation over time of the SOFC fuel cell, by compensating for its drop in performance by a higher temperature, or by optimizing the preheating of the fuel cell inlet gases by heat exchange between the inlet and the outlet;

the thermal management of the SOFC fuel cell according to the invention at a maximum temperature of 850° C. offers a possible operation at a higher inlet temperature (800° C. instead of 700° C.), giving it a much better electrical efficiency than according to the prior art. Indeed, the difficulty of cooling pure hydrogen in an SOFC fuel cell system according to the prior art generally imposes a maximum inlet temperature of 700° C.;

the air flow rate is only used to supply the necessary oxidant to the SOFC fuel cell according to the invention. In other words, it does not have a significant cooling role as in the SOFC fuel cell systems according to the prior art that are supplied directly with hydrogen, i.e. without a closed loop for circulating carbon-based species and without a methanation reactor according to the invention;

the (re)circulation of the fuel is simple to carry out in a system according to the invention because the circulating gas mixtures are dry, seeing as all the water leaving the fuel cell is evacuated by condensation. The recirculation accessories (pumps) are then less expensive than in the systems according to the prior art. The water needed for the internal reforming is provided by the methanation reaction itself. The invention thus also differs from conventional SOFC fuel cell systems in which the water formed by the fuel cell is used to reform the fuel internally, which requires a recirculation of the steam which is difficult to carry out.

The term "reversible" is understood within the context of the invention to mean that the SOFC fuel cell may be used as an HTE electrolyzer in electrolysis operating mode, the reverse mode to that of the fuel cell, the anode(s) of the SOFC fuel cell then acting as cathode(s) of the electrolyzer.

In SOFC fuel cell operating mode according to the invention, there is no storage of hydrogen in the tank supplying the methanation reactor. Moreover, the heat released by the methanation reaction may be used for the system, in particular by being supplied to the hydrogen storage tank in order to desorb the hydrogen.

In HTE electrolysis operating mode according to the invention, no methanation reaction is carried out and the tank is used only for storing the hydrogen produced by the electrolysis. In addition, the heat released by the storage of the hydrogen may be used for the system, in particular by being supplied to the steam generator upstream of the HTE electrolyzer.

According to one advantageous embodiment, the fuel cell is a reactor with a stack of individual electrochemical cells of SOFC type each formed of a cathode, an anode and an electrolyte inserted between the cathode and the anode, and a plurality of electrical and fluidic interconnectors each of which is arranged between two adjacent individual cells with one of its faces in electrical contact with the cathode of one of the two individual cells and the other of its faces in electrical contact with the anode of the other of the two individual cells.

Each anode of the fuel cell consists of a nickel-yttria-stabilized zirconia (Ni-YSZ) cermet.

The methanation reactor preferably comprises a solid methanation catalyst based on nickel (Ni) supported by a zirconium oxide ($ZrO_2$), or based on nickel (Ni) supported by an aluminum oxide ($Al_2O_3$), or that is bimetallic based on nickel (Ni) and iron (Fe) supported by an aluminum oxide ($Al_2O_3$), preferably Ni—Fe/$\gamma$-$Al_2O_3$, or based on nickel (Ni) supported by mixed oxides of cerium (Ce) and of zirconium, preferably $Ce_{0.72}Zr_{0.28}O_2$.

The hydrogen tank may be a tank for storing hydrogen in solid form, preferentially containing metal hydrides, preferably magnesium hydrides ($MgH_2$), the pressure of the tank then being between 2 and 15 bar, preferably between 8 and 12 bar in the case of magnesium hydrides, or a tank for storing hydrogen in the form of gaseous hydrogen, preferably compressed between 200 and 700 bar, more preferably between 350 and 700 bar.

Advantageously, the system comprises at least a first heat exchanger, suitable for preheating, at the inlet of the fuel cell, the gases originating from the methanation reactor using the heat emitted by the gases at the outlet of the fuel cell.

Advantageously also, the system comprises at least a second heat exchanger, suitable for preheating, at the inlet of the methanation reactor, the gases originating from the hydrogen tank and/or gas-liquid phase separator, using the heat emitted by the gases at the outlet of the fuel cell after the first exchanger.

In the system according to the invention, two temperature levels are required: a first level at relatively low temperature, typically between 400° C. and 500° C. for the methanation reaction and a second level at relatively high temperature, typically between 700° C. and 800° C. for the operation of the fuel cell. Thus, the use of the first and second heat exchangers makes it possible to manage these two different temperature levels in the best way possible.

Another subject of the invention is a process for the continuous operation of the reversible system described previously, comprising the following simultaneous steps:

desorption of the hydrogen from the tank in order to supply the inlet of the methanation reactor;

operation of the methanation reactor;

operation of the fuel cell in an inlet temperature range between 700° C. and 800° C.;

operation of the gas-liquid separator so as to separate the water from the gas mixture mainly comprising hydrogen ($H_2$), carbon monoxide (CO) and carbon dioxide ($CO_2$), at the outlet of the fuel cell, in which process the molar flow rate of hydrogen leaving the tank that supplies the inlet of the methanation reactor is substantially equal to the flow rate oxidized to water in the fuel cell and condensed in the separator.

Preferably, the hydrogen from the tank is mixed with the gas mixture formed by hydrogen ($H_2$), carbon monoxide (CO) and carbon dioxide ($CO_2$) from the fuel cell, before the injection thereof into the methanation reactor. The difference between the flow rate of hydrogen circulating and the flow rate of hydrogen that has left the tank enables a flexibility of operation of the system in particular for a flexibility in electrical power produced without requiring of the fuel cell an excessively high rate of use of the fuel.

Preferably also, the flow rate of methane ($CH_4$) leaving the methanation reactor is adjusted and the nominal current-voltage (I, U) operating point of the fuel cell (SOFC) is chosen so as to obtain an autothermal operating regime of the fuel cell (SOFC).

According to yet another advantageous variant, at least a portion of the heat emitted by the methanation reactor is recovered and is supplied to the hydrogen tank in order to desorb the hydrogen. If it is a pressurized gaseous hydrogen tank, this heat at around 400° C. may be reused in other forms of cogeneration.

The invention finally relates to the use of part of the reversible system described previously for producing and storing hydrogen at high temperature, wherein:
- the cell(s) is (are) used as electrolysis cell(s) by forming a high-temperature electrolyzer (HTE);
- the outlet of the HTE electrolyzer is connected to the hydrogen storage tank.
- if it is a tank for storing hydrogen in the form of hydrides, the heat released during the absorption is used to vaporize the water necessary for the electrolyzer.

In this use, the second heat exchanger is preferably suitable for preheating, at the inlet of the HTE electrolyzer, the steam from the steam generator using the heat emitted by the hydrogen and/or the steam at the outlet of the HTE electrolyzer.

DETAILED DESCRIPTION

Other advantages and features of the invention will emerge more clearly on reading the detailed description of examples of the implementation of the invention given by way of illustration and non limitingly with reference to the following figures, among which:

Figure 1:
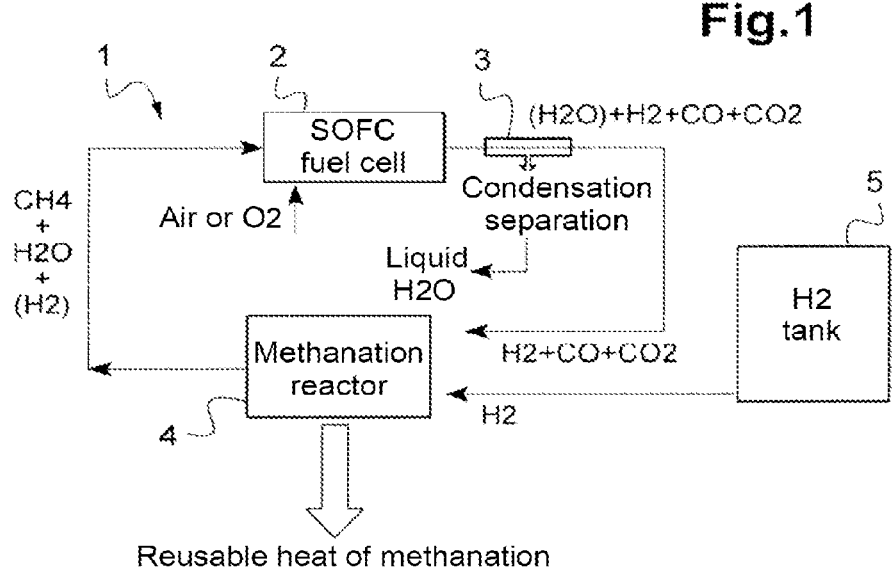
FIG. 1 is a schematic view of the principle of the system for generating electricity by SOFC fuel cell according to the invention.

Throughout the present application, the terms "inlet", "outlet", "downstream" and "upstream" should be understood with reference to the direction of closed-loop circulation of the gases respectively through the SOFC fuel cell and the methanation reactor. In HTE electrolyzer mode, the same terms should be understood with reference to the direction of circulation of the steam and air supplying the electrolyzer, and of the hydrogen and oxygen which are produced therein.

It is also specified that the fuel cell described is of solid oxide type (SOFC, solid oxide fuel cell) operating at high temperature. Thus, all the constituents (anode/electrolyte/cathode) of an electrolysis cell are ceramics.

Typically, and preferably, the features of an SOFC individual electrochemical cell suitable for a fuel cell according to the invention, of anode support cell (ASC) type, may be those indicated as follows in table 1 below.

TABLE 1

| Electrochemical cell | Unit | Value |
|---|---|---|
| Anode | | |
| Constituent material | | Ni—YSZ |
| Thickness | μm | >500 |
| Thermal conductivity | W m$^{-1}$ K$^{-1}$ | 13.1 |
| Electrical conductivity | Ω$^{-1}$ m$^{-1}$ | 10$^5$ |
| Porosity | | 0.37 |

TABLE 1-continued

| Electrochemical cell | Unit | Value |
|---|---|---|
| Permeability | m$^2$ | 10$^{-13}$ |
| Tortuosity | | 4 |
| Current density | A · m$^{-2}$ | 5300 |
| Cathode | | |
| Constituent material | | LSM |
| Thickness | μm | 20 |
| Thermal conductivity | W m$^{-1}$ K$^{-1}$ | 9.6 |
| Electrical conductivity | Ω$^{-1}$ m$^{-1}$ | 1 × 10$^4$ |
| Porosity | | 0.37 |
| Permeability | m$^2$ | 10$^{-13}$ |
| Tortuosity | | 4 |
| Current density | A · m$^{-2}$ | 2000 |
| Electrolyte | | |
| Constituent material | | YSZ |
| Thickness | μm | |
| Resistivity | Ω m | 0.42 |

An SOFC fuel cell that is suitable for the invention is preferably a reactor with individual electrochemical cells C1, C2, of solid oxide type (SOFC) that are stacked alternately with interconnectors. Each cell consists of a cathode and an anode, between which an electrolyte is positioned.

To date, SOFC fuel cell systems operate at high temperature either with a fuel cell supplied with pure hydrogen, or supplied directly with methane and steam.

The first conventional approach of supplying pure hydrogen has the major constraint of cooling which is necessary due to the exothermic reaction of the oxidation of hydrogen.

The solutions for achieving this have many drawbacks.

The second conventional approach of supplying methane and steam makes it possible to overcome this major constraint since by using a type of anode made of nickel-zirconia cermet, it benefits from the endothermic reforming reaction at this anode.

Although this second approach appears natural when the SOFC fuel cell may be easily coupled to a methane distribution network, it cannot, conversely, be used when this is not technically and/or economically possible.

Thus, the major constraint of cooling an SOFC fuel cell still remains when the latter may only be supplied from a hydrogen tank, which concerns a large number of applications.

Therefore, the inventors have wisely thought of arranging a methanation reactor between an SOFC fuel cell and a hydrogen storage tank.

It is then possible to operate the SOFC fuel cell with methane $CH_4$ produced by hydrogenation in the methanation reactor with the major advantage of circulating, in a closed loop, the carbon-based species converted both in the fuel cell and in the methanation reactor.

A system 1 according to the invention carrying out such a closed-loop circulation of carbon-based species is represented schematically in FIG. 1.

Thus, the system 1 respectively comprises, in a closed loop from upstream to downstream, an SOFC fuel cell 2, a condensation/separation device 3, a methanation reactor 4.

Thus, the inlet of the SOFC fuel cell 2 is connected to the outlet of the methanation reactor 4. The inlet of the methanation reactor 4 is itself connected to the outlet of the SOFC fuel cell 2.

The condensation/separation device 3 is connected downstream to the outlet of the fuel cell 2 and upstream to the methanation reactor 4.

Moreover, the inlet of the methanation tank 4 is connected to the outlet of a tank 5 for reversible storage of hydrogen.

As shown in FIG. 1, the heat that is released from the methanation reactor may be reused. In particular, it may advantageously be used partly in the loop of the system according to the invention, as described below.

Prior to its nominal operation, the system 1 operates in the following manner.

The fuel cell 2 operates at low current and at a low rate of use of pure hydrogen. The hydrogen that is not consumed circulates in a closed loop within the system 1. The hydrogen consumed in the loop is replaced by hydrogen originating from the tank 5 and produces water that is condensed.

Upstream of the methanation reactor 4, an amount of $CO_2$ is introduced stepwise so as to reach the set amount, i.e. at an $H_2$ flow rate value divided by 4.

During the stepwise introduction of this amount of $CO_2$, the fuel cell 2 then receives a mixture of $CH_4+H_2O+H_2$ until it no longer receives hydrogen as overhead.

The current is then gradually increased stepwise so as to compensate for the endothermicity of the internal reforming of the $CH_4$.

Once the target amount of $CO_2$ is introduced, the injection of $CO_2$ is stopped and the amount of carbon goes round within the closed-loop system.

The nominal closed-loop operation of a system 1 in SOFC fuel cell mode according to the invention is the following.

The hydrogen delivered by the tank 5 and the required amount of carbon dioxide $CO_2$ initially introduced at the inlet of the methanation reactor 4 produce methane and water ($CH_4+H_2O$) with, where appropriate, over-stoichiometric hydrogen originating from the tank 5.

Specifically, within the reactor 4 containing a solid catalyst for the methanation reaction, the following reactions are possible in the temperature range of from 400° C. to 500° C.

A single hydrogenation reaction of the $CO_2$ (1) may take place according to the following equation:

$$CO_2 + 4H_2 \rightarrow CH_4 + 2H_2O \quad (1)$$

Both a hydrogenation reaction of the $CO_2$ (2) and a reverse water-gas shift reaction (3) may take place according to the following equations:

$$CO_2 + H_2 \rightarrow CO + H_2O \quad (2)$$

$$CO + 3H \rightarrow CH_4 + H_2O \quad (3)$$

It goes without saying that it is possible to have, within the context of the invention, a complete or incomplete methanation within the reactor 4. In the case where the methanation is not complete, hydrogen then remains at its outlet, and the performances of the fuel cell are increased by the presence of this hydrogen but the thermal management targeted by the invention will be lower than in the case of a complete methanation.

The $CH_4+H_2O+(H_2)$ gas mixture resulting from the reactor 4 is then introduced into the inlet of the fuel cell 2. The reactions (1), (2) and (3) then take place within the fuel cell 2 in the reverse direction.

A reforming reaction thus takes place that converts the methane and water into hydrogen and carbon monoxide ($H_2+CO$), fuels that can be used by the fuel cell. The electrochemical operation of the fuel cell 2 results in these species being oxidized to water and carbon dioxide ($H_2O+CO_2$), the fuel cell being supplied simultaneously with oxidant that is provided by air or oxygen.

As indicated above, the fuel cell 2 uses a (some) cell(s), the (anode) support of which is a cermet based on Ni-YSZ, which enables complete reforming of the methane $CH_4$ within the fuel cell. Thus, the gas at the outlet of the fuel cell consists of a mixture of hydrogen $H_2$ and CO not used within the fuel cell and also of $CO_2$ and $H_2O$ formed by the fuel cell.

It goes without saying that it is also possible to have, within the context of the invention, a reforming that is not complete within the fuel cell 2. In the latter case, only the performances of the fuel cell 2 are in part affected by potentially less hydrogen present and a dilution by the methane $CH_4$.

At the outlet of the fuel cell 2, the water is removed by condensation within the condensation/separation device 3.

At the outlet of the device 3, the dry outlet gas mixture is then reinjected within the methanation reactor and it is supplemented by hydrogen from the tank 5.

According to the invention, the molar flow rate of hydrogen from the tank 5 corresponds to the flow rate that is oxidized to water within the fuel cell 2, and therefore to the flow rate of water condensed and discharged by the device 3.

When the recirculation of the dry outlet gases is complete, the flow rate circulating within the fuel cell 2 may be much greater than the flow rate from the tank 5. The rate of use of hydrogen within the system 1 is 100% (no hydrogen lost or burnt).

Thus, the system according to the invention that has just been described enables the use of the carbon-based species in the closed loop in their entirety. There is therefore no release of CO or release of $CO_2$ at the outlet of the fuel cell 2 in the nominal regime.

To demonstrate the great advantage that the invention presents, the inventors have designed a system with a tank 5 for the reversible storage of hydrogen based on magnesium hydrides $MgH_2$.

This type of storage is advantageous since it makes it possible to use at least a portion of the heat emitted by the methanation reactor 4 by coupling the latter to the tank 5. Such a tank 5 containing $MgH_2$ hydrides typically operates at a temperature of the order of 380° C.

The desorption of the hydrogen from the tank 5 in order to supply the fuel cell 2 requires the provision of heat which is therefore advantageously provided by the methanation reactor 4.

Moreover, the absorption of the hydrogen in the tank 5 is exothermic and may make it possible to vaporize the water necessary when a portion of the system according to the invention is used in reverse water electrolysis (HTE) mode.

The inventors have thus carried out various examples according to the invention and according to the prior art, by way of comparison, both for the operation in SOFC fuel cell mode and in HTE electrolyzer mode.

It is specified that in the tables below, the values have been rounded up.

Examples 1 and 2 According to the Invention

The system 1 according to the invention comprises the essential elements already described.

Figure 2:
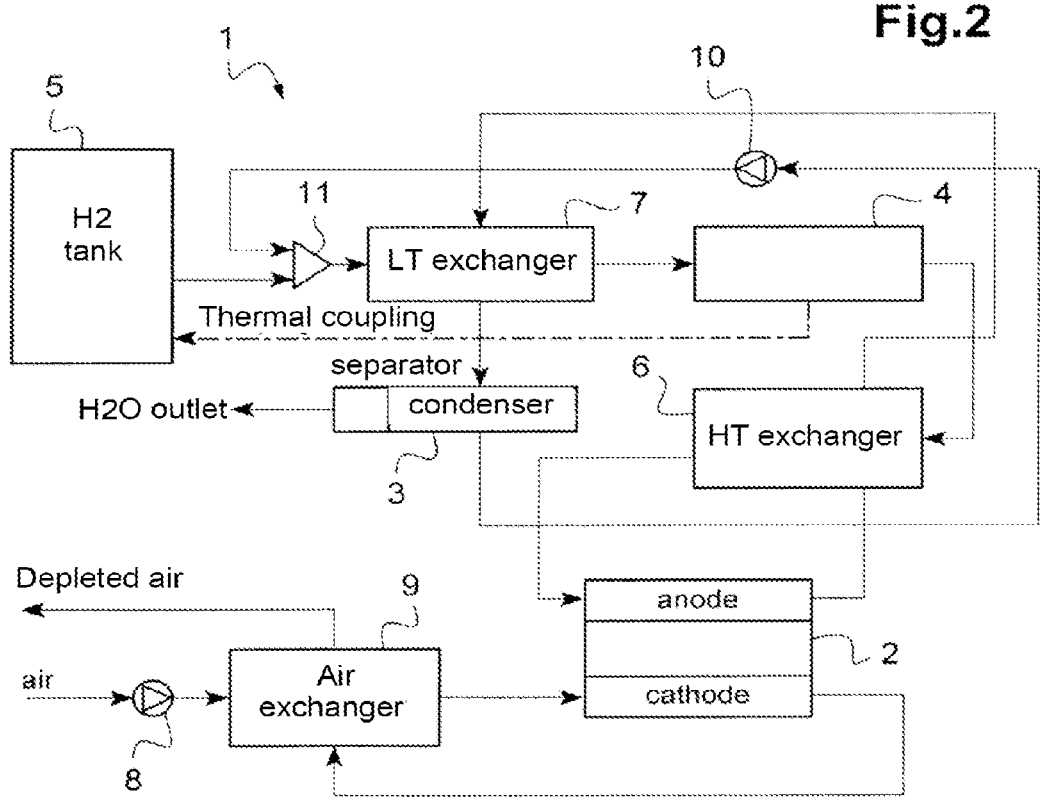
FIG. 2 is a schematic view of an example of the system for generating electricity by SOFC fuel cell according to the invention.

In addition, as illustrated in FIG. 2, the system 1 according to the invention firstly comprises a high-temperature exchanger 6 (HT exchanger in FIG. 2).

This exchanger 6 is suitable for preheating, at the inlet of the fuel cell 2, the gases originating from the methanation reactor 4, to around 700° C., using the heat emitted by the gases at the outlet of the fuel cell.

The system 1 additionally comprises another heat exchanger 7 at lower temperature (LT exchanger in FIG. 2).

This exchanger 7 is suitable for preheating, at the inlet of the methanation reactor 4, the gases originating from the hydrogen tank and/or gas-liquid phase separator 3, using the heat emitted by the outgoing gases after the high-temperature exchanger.

An air compressor 8 is also provided for supplying air, as oxidant, to the fuel cell 2.

The air supplying the fuel cell 2 is reheated by the depleted air at the outlet of the fuel cell 2 by means of another exchanger 9.

Finally, in the closed-loop circuit, a circulation pump 10 is arranged in order to circulate the gas mixtures from the fuel cell 2 to the methanation reactor 4.

As a variant, as illustrated in FIG. 2, provision may be made for mixing between the dry gas mixture ($H_2$+CO+$CO_2$) from the condenser 3 and the hydrogen $H_2$ delivered by the tank 5 upstream of the inlet of the methanation reactor 4.

Such mixing may be carried out by any known gas mixer 11.

The design of the fuel cell according to the invention and the nominal operating conditions are the following.

The SOFC fuel cell 2 comprises a stack of 50 cells of 100 $cm^2$ each.

Each cell comprises an anode consisting of a Ni-YSZ cermet having a thickness of at least 500 μm that enables total internal reforming starting from 700° C.

The inlet temperature of the fuel cell 2 is 700° C. (example 1) or 800° C. (example 2).

According to the invention, the flow rate of $CO_2$ circulating in the closed loop between the fuel cell 2 and the methanation reactor 4 is adjusted to the circulating hydrogen flow rate.

Thus, the $CO_2$ flow rate is equal to the $H_2$ flow rate divided by 4 times the rate of use of the fuel from the methanation reactor.

The cooling power is available without electricity, that is to say that the cooling is carried out solely with available industrial water and therefore without having to use an electrically-powered source of cold production.

The efficiencies of the accessories of the system are the following:
efficiency of the electric converter of the current produced by the fuel cell 2: 95%
efficiency of the compressors 9, 10: 50%
pressure drops over the flushing of air for supplying the fuel cell 2 estimated at 10.8 mbar/nml/min/$cm^2$.

Comparative Example

An SOFC fuel cell 2 supplied directly by a hydrogen tank 5 according to the prior art is considered.

In other words, conventionally an SOFC fuel cell 2 operates with pure hydrogen as fuel provided directly by a tank 5.

The air, as oxidant, is also compressed by the same type of air compressor 9.

The conditions are the same as those of the examples according to the invention, with the exception of the flow rate for supplying air to the fuel cell 2 which is of the order of 48 Nml/min/$cm^2$ for a current of 0.5 A/$cm^2$ if the fuel cell is a pure $H_2$ fuel cell.

The results of the calculations are indicated in table 2 below.

TABLE 2

| | | System | |
| --- | --- | --- | --- |
| Conditions | Comparative example | Example 1 according to the invention (fuel cell inlet temperature equal to 700° C.) | Example 2 according to the invention (fuel cell inlet temperature equal to 800° C.) |
| $H_2$ flow rate ($m^3$/s) | 1 | 1 | 1 |
| Air flow rate (NmL/min/cmm$^2$) | 48 | 30 | 30 |
| Number of cells in the fuel cell 2 | 50 | 50 | 50 |
| Power of the air compressor 9 (W) | 375 | 160 | 160 |
| Boosting of the air compressor 9 (mbars) | 500 | 325 | 325 |
| Rate of use of fuel (%) | 60 | 53 | 53 |
| $CO_2$ flow rate (mol/s) | 0 | 5.85 * $10^{-3}$ | 5.85 * $10^{-3}$ |
| Power required for $H_2$ desorption from the tank 5 (W) | 1000 | 0 | 0 |
| Lower calorific value (LCV) of $H_2$ (W) | 3000 | 3000 | 3000 |
| Lack of electrical overheating (W) | 0 | 0 | 227 |
| Cooling power of the condenser 3 (W) | 825 | 1020.77 | 768 |
| Power delivered equal to U * I (W) | 2011 | 1727 | 1966 |
| Outlet temperature (° C.) | 846 | 747 | 792 |
| Efficiency | 0.46 | 0.55 | 0.58 |

The maximum outlet temperature of the fuel cell 2 is 850° C., irrespective of the inlet temperature.

The outlet flow rate from the hydrogen storage tank 5 is 1 $Nm^3$/h for a current density leaving the fuel cell 2 of the order of 0.5 A/$cm^2$. At this hydrogen flow rate of 1 $Nm^3$/h, the heat to be provided to the tank 5 is of the order of 1 kW.

The flow rate for supplying air to the fuel cell 2 is of the order of 12 to 30 Nml/min/$cm^2$.

It emerges from this table 2 that the efficiency of an SOFC fuel cell 2 directly supplied with pure hydrogen according to the prior art is 46%.

An electricity consumption is also noted for the air compressors 9 and for the desorption of the hydrogen from the tank 5 which is higher for an SOFC fuel cell system according to the prior art (comparative example) compared to a system according to the invention (examples 1 and 2).

Furthermore, the nominal operating mode in a system according to the prior art requires a temperature difference between the inlet and the outlet of the fuel cell 2 of the order of 150° C.

In the case of the fuel cell mode according to the invention, the efficiency of the system according to the invention is 55% at 700° C. and 58% at 800° C., i.e. a gain in efficiency of more than 10% compared to a conventional system according to the prior art with direct supply of an SOFC fuel cell with pure hydrogen from a hydride storage tank. The heat emitted by the methanation reactor 4 is then sufficient to desorb the hydrogen from the tank 5. The fuel cell 2 is only subjected to a gradient from 50° C. to 700° C. and its operation is virtually autothermal at 800° C.

The inventors also carried out an analysis on the HTE electrolyzer mode for producing and storing hydrogen at high temperature.

Figure 3:
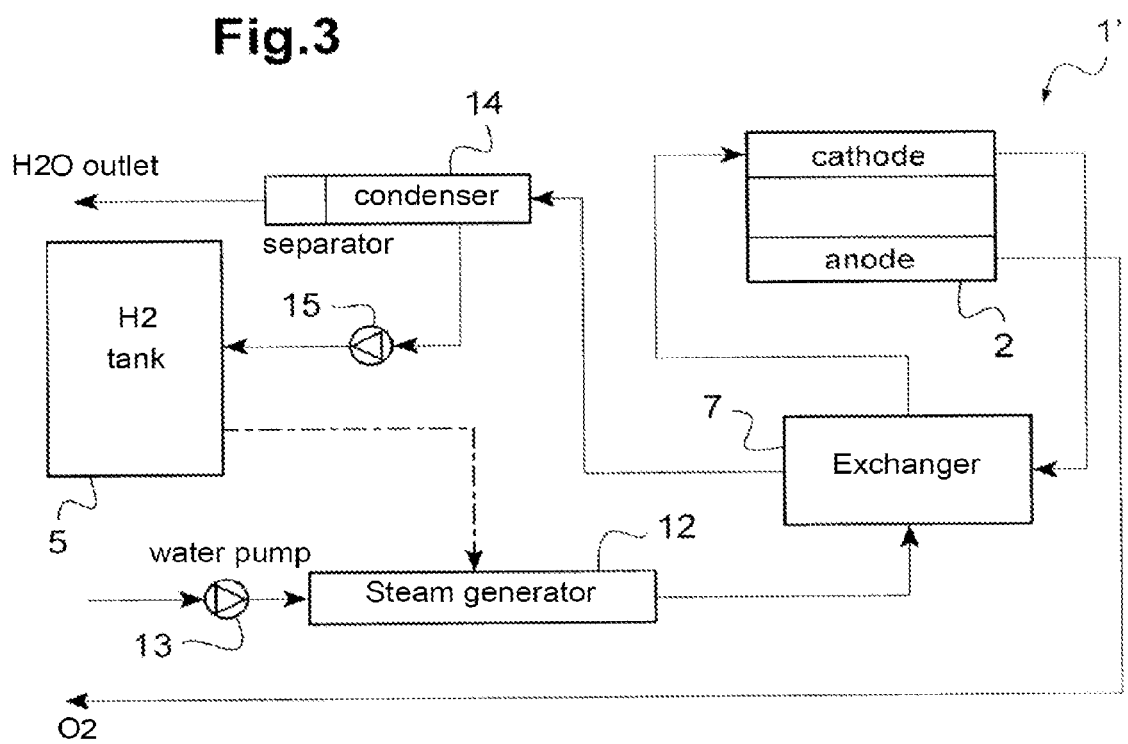
FIG. 3 is a schematic view is a schematic view of an example of producing hydrogen by HTE electrolysis of water and of storing the hydrogen produced, using in reverse mode a part of the system from FIG. 2.

Thus, in this mode, the stack of the cells according to the invention is used as electrolysis cell(s) by forming a high temperature electrolyzer (HTE) 2, as illustrated in FIG. 3.

The outlet of the HTE electrolyzer 2 is connected to the hydrogen storage tank 5.

The design of the HTE electrolyzer according to the invention and the nominal operating conditions are the following.

The HTE electrolyzer 2 comprises a stack of 50 cells of 100 cm$^2$ each. Each cell comprises a cathode consisting of an Ni-YSZ cermet having a thickness of at least 500 µm.

The operation of the electrolyzer 2 is autothermal at around 700° C.

The rate of use of the steam injected into the electrolyzer 2 is of the order of 75%.

The heat delivered by the tank 5 and provided to the electrolyzer 2 is of the order of 1 kW for a hydrogen flow rate of the order of 1 Nm$^3$/h of hydrogen.

The cooling power is here also available without electricity.

The efficiencies of the accessories of the system are the following:
efficiency of the electrical converter of the current provided to the electrolyzer 2: 95%
efficiency of the compressors 9, 10: 50%.

TABLE 3

| Conditions | System Example according to the invention (electrolyzer operating temperature equal to 700° C.) |
|---|---|
| H$_2$ flow rate (m$^3$/s) | 2.91 |
| Number of cells in the electrolyzer 2 | 50 |
| Power of the H$_2$ compressor 15 at 12 bar (W) | 683 |
| Rate of use of steam (%) | 75 |
| Power required for the superheating of the steam (W) | 155 |
| Power for adsorption of the hydrides (W) | 2907 |
| Lower calorific value (LCV) of H$_2$ (W) | 8720 |
| Lack of electrical overheating (W) | 0 |
| Cooling power of the condenser 3 (W) | 949 |
| Power to be provided equal to U * I (W) | 9798 |
| Efficiency | 0.82 |

With the above data, a system according to the invention, the operation of which is reversible between an SOFC fuel cell mode and an HTE electrolyzer mode using a reversible tank for storage/withdrawal of hydrogen, has an overall efficiency, i.e. with return to available electricity, of the order of 48% (equal to the efficiency from table 2 of 0.58 multiplied by the efficiency from table 3 equal to 82%), which to the knowledge of the inventors remains unequalled.

The invention is not limited to the examples that have just been described; it is possible in particular to combine together features from examples illustrated within variants that are not illustrated.

Other variants and improvements of the invention may be carried out without thereby departing from the scope of the invention.

In particular, the variation of the outlet flow rate from the tank for reversible storage of hydrogen enabling a flexibility, in terms of power of the SOFC fuel cell according to the invention has not been illustrated.

Equally, although the storage tank studied in the examples illustrated according to the invention is of the type containing magnesium hydrides MgH$_2$, it is perfectly possible to envisage other types of hydride or more generally all types of storage in solid form, or in liquid or gaseous form.

As already mentioned, the hydrogenation reaction of the CO$_2$ for the most part and of the CO in a closed loop within the methanation reactor is exothermic and takes place in a temperature range around 400° C. to 500° C. This heat thus advantageously makes it possible to preheat the inlet gases of the methanation reactor, to around 400° C., that is to say either the hydrogen (H$_2$) from the tank, or the H$_2$+CO+CO$_2$ gas mixture from the phase separator that enables the condensation. It goes without saying that it is possible to seek to re-use the rest of the heat emitted by the methanation reactor.

As regards the methanation reactions within the reactor, the catalysts used may be based on nickel supported by a zirconium oxide (ZrO$_2$), or based on nickel (Ni) supported by an aluminum oxide (Al$_2$O$_3$). The publication [1] has illustrated the important catalytic activity for a catalyst based on nickel (Ni) supported by mixed oxides of cerium (Ce) and zirconium of formula Ce$_{0.72}$Zr$_{0.28}$O$_2$. Similarly, the publication [2] has shown, for a methanation under a pressure of 30 bar, the excellent catalytic activity of a bimetallic catalyst based on nickel (Ni) and iron (Fe) supported by an aluminum oxide (Al$_2$O$_3$) of formula Ni—Fe/$\gamma$-Al$_2$O$_3$.

Several types of already proven reactors may be envisaged for carrying out the methanation.

Mention may firstly be made of fixed-bed reactors in which the solid catalyst is incorporated in the form of grains or pellets. The drawback of reactors of this type is the thermal management which is difficult to achieve for exothermic reactions such as methanation.

Mention may also be made of reactors with structured channels such as multitubular reactors, monolithic reactors and plate reactors, in which the solid catalyst is generally deposited in the form of a coating in the reactive channels. These reactors are highly suitable for a methanation reaction which requires a good thermal management. They are generally more expensive.

Finally, mention may be made of fluidized-bed or entrained-bed type reactors in which the catalyst to be fluidized is in powder form. These reactors are highly suitable for reactions with very high volumes of reactants. Furthermore, the fluidization of the catalyst enables a very good thermal homogenization of the mixture of reactants in the reactor and therefore a better thermal control.

REFERENCES CITED

[1]: Fabien Ocampo et al., "*Methanation of carbon dioxide over nickel-based Ce$_{0.72}$Zr$_{0.28}$O$_2$ mixed oxide catalysts*

*prepared by sol-gel method*". Journal of Applied Catalysis A: General 369 (2009) 90-96;

[2]: Dayan Tiang et al., "*Bimetallic Ni—Fe total-methanation catalyst for the production of substitute natural gas under high pressure*", Journal of Fuel 104 (2013) 224-229.

The invention claimed is:

1. A reversible system for generating electricity with a solid oxide fuel cell (SOFC) comprising:
    said solid oxide fuel cell (SOFC) comprising at least one solid oxide individual electrochemical cell each said solid oxide individual electrochemical cell is formed of a cathode, an anode and an electrolyte inserted between the cathode and the anode;
    a gas-liquid phase separator, connected to an outlet of the solid oxide fuel cell;
    a methanation reactor, suitable for carrying out a methanation reaction, an inlet of which is connected to an outlet of the gas-liquid phase separator and an outlet of which is connected to an inlet of the solid oxide fuel cell so that the mixture resulting from the methanation reactor is introduced into the solid oxide fuel cell; and
    a tank for reversible storage of hydrogen, configured for storing hydrogen, an outlet of which is connected to the inlet of the methanation reactor.

2. The reversible system according to claim 1, wherein the solid oxide fuel cell is a reactor with a stack of solid oxide individual electrochemical cells each said solid oxide individual electrochemical cell is formed of a cathode, an anode and an electrolyte inserted between the cathode and the anode, and a plurality of electrical and fluidic interconnectors each said electrical and fluidic interconnector is arranged between two adjacent solid oxide individual electrochemical cells with one of said electrical and fluidic interconnector faces in electrical contact with the cathode of one of the two solid oxide individual electrochemical cells and the other of said electrical and fluidic interconnector faces in electrical contact with the anode of the other of the two solid oxide individual electrochemical cells.

3. The reversible system according to claim 1, wherein each anode of the solid oxide fuel cell comprises a nickel-yttria-stabilized zirconia (Ni-YSZ) cermet.

4. The reversible system according to claim 1, wherein the methanation reactor comprises a solid methanation catalyst comprising nickel (Ni) supported by a zirconium oxide ($ZrO_2$), or nickel (Ni) supported by an aluminum oxide ($Al_2O_3$), or that is bimetallic comprising nickel (Ni) and iron (Fe) supported by an aluminum oxide ($Al_2O_3$), or comprising nickel (Ni) supported by mixed oxides of cerium (Ce) and of zirconium.

5. The reversible system according to claim 1, wherein the hydrogen tank is either a tank for storing hydrogen in solid form, the pressure of the tank then being between 2 and 15 bar, or a tank for storing hydrogen in the form of gaseous hydrogen then compressed between 200 and 700 bar.

6. The reversible system according to claim 1, further comprising at least a first heat exchanger, configured for preheating, at the inlet of the solid oxide fuel cell, gases originating from the methanation reactor using heat emitted by gases at the outlet of the fuel cell.

7. The reversible system according to claim 6, further comprising at least a second heat exchanger, configured for preheating, at the inlet of the methanation reactor, gases originating from the hydrogen tank and/or gas-liquid phase separator, using the heat emitted by the gases at the outlet of the solid oxide fuel cell after the first exchanger.

8. A process for the continuous operation of the reversible system according to claim 1, the process comprising the following being performed simultaneously:
    carrying out desorption of the hydrogen from the tank in order to supply the inlet of the methanation reactor;
    operating the methanation reactor;
    operating the fuel cell in an inlet temperature range between 700° C. and 800° C.; and
    operating the gas-liquid separator so as to separate the water from the gas mixture mainly comprising hydrogen ($H_2$), carbon monoxide (CO) and carbon dioxide ($CO_2$), at the outlet of the fuel cell,
    wherein a molar flow rate of hydrogen leaving the tank that supplies the inlet of the methanation reactor is substantially equal to the flow rate oxidized to water in the fuel cell and condensed in the separator.

9. The operating process according to claim 8, wherein the hydrogen from the tank is mixed with the gas mixture formed by hydrogen ($H_2$), carbon monoxide (CO) and carbon dioxide ($CO_2$) from the fuel cell, before the injection thereof into the methanation reactor.

10. The operating process according to claim 8, wherein the flow rate of methane ($CH_4$) leaving the methanation reactor is adjusted and the nominal current-voltage (I, U) operating point of the fuel cell (SOFC) is chosen so as to obtain an autothermal operating regime of the fuel cell (SOFC).

11. The operating process according to claim 8, wherein at least a portion of the heat emitted by the methanation reactor is recovered and is supplied to the hydrogen tank in order to desorb the hydrogen.

12. A process for producing and storing hydrogen at high temperature with the reversible system according to claim 1, the process comprising:
    forming a high-temperature electrolyzer (HTE) with the fuel cells, which are electrolysis cells; and
    connecting the outlet of the HTE electrolyzer to the hydrogen storage tank.

13. The method according to claim 12, wherein the reversible system comprises at least a second heat exchanger being suitable for preheating, at the inlet of the HTE electrolyzer, the steam using the heat emitted by the hydrogen and/or the steam at the outlet of the HTE electrolyzer.

* * * * *

UNITED STATES PATENT AND TRADEMARK OFFICE
CERTIFICATE OF CORRECTION

| | | |
|---|---|---|
| PATENT NO. | : 10,608,271 B2 | Page 1 of 1 |
| APPLICATION NO. | : 15/562614 | |
| DATED | : March 31, 2020 | |
| INVENTOR(S) | : Magali Reytier et al. | |

It is certified that error appears in the above-identified patent and that said Letters Patent is hereby corrected as shown below:

On the Title Page

Item (71), the Applicant's name is incorrect. Item (71) should read:
--(71) Applicant: COMMISSARIAT A L'ENERGIE ATOMIQUE ET AUX ENERGIES ALTERNATIVES, Paris (FR)--

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*